May 5, 1931. J. J. ULMAN 1,803,571

HEATING AND ILLUMINATING DEVICE FOR FISH AQUARIUMS

Filed Nov. 14, 1929

INVENTOR
John J. Ulman

BY
Brockett, Hyde, Higley & Meyer
ATTORNEY.

Patented May 5, 1931

1,803,571

UNITED STATES PATENT OFFICE

JOHN J. ULMAN, OF CLEVELAND, OHIO

HEATING AND ILLUMINATING DEVICE FOR FISH AQUARIUMS

Application filed November 14, 1929. Serial No. 407,169.

This invention relates to improvements in heating and illuminating devices for aquariums and more particularly, for tropical fish aquariums of a size suitable for household use. In tropical fish aquariums, it is, of course, necessary to carefully maintain the water at proper temperature and illumination of the aquarium is necessary for proper examination and display of the fish.

The general objects of the present invention are the provision of an improved heating and illuminating device for a tropical fish aquarium, which device is of exceedingly simple and inexpensive construction, comprising a minimum number of easily formed and easily assembled parts; in which device there is a single member which during the day, serves as a reflector to direct the light rays from an electric light bulb into the central part of the aquarium and which during the night, serves as a shield to protect the fish from the glare of the rays; which device includes a readily visible thermometer so that the temperature of the water is always conspicuously indicated; and which device is of especially attractive appearance and highly efficient in use.

Further objects of the invention are in part obvious and in part will appear more in detail hereinafter.

Figure 1:
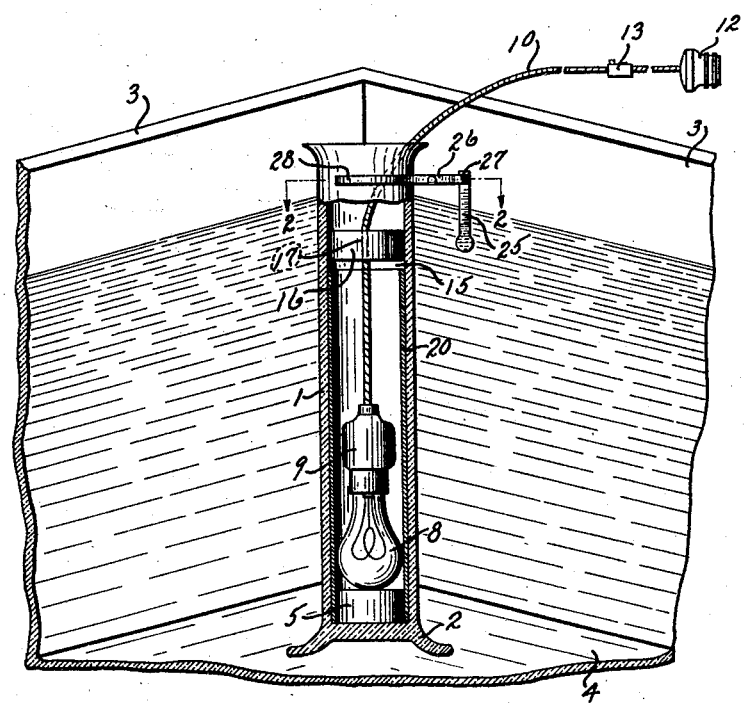
Figure 2:
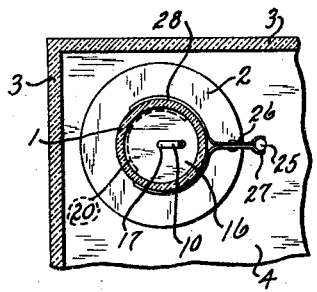
Figure 3:
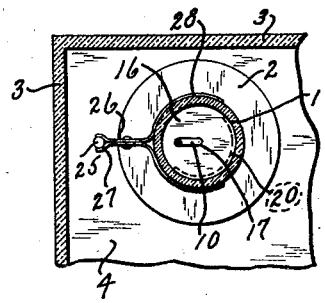

The invention will be readily understood from the following description thereof, reference being had to the accompanying drawing in which Fig. 1 is a vertical sectional view of the present improved heating and illuminating device arranged in one corner of a fish tank; Fig. 2 is a cross sectional view thereof on the line 2—2, Fig. 1, showing the device in its normal day-time position; and Fig. 3 is a similar view showing the device in its normal night-time position.

The present improved heating and illuminating device includes a tubular glass container 1 provided with a suitable base 2 and open at its top and closed at its bottom. Said container is, of course, of a height greater than the depth of the liquid in the tank in which it is adapted to be used, such a tank with glass sides 3 and a glass bottom 4 being shown in the drawings. To maintain the device in proper position in the tank, such as in one corner thereof, against the buoying effect of the water in the tank, a suitable weight 5 is preferably placed in the bottom of the container, as indicated.

Resting on the top of this weight is an ordinary electric light bulb 8 which constitutes the heating and illuminating means, said bulb being of such candle power, such as two, as to readily maintain the water of the tank at the proper temperature, say seventy degrees. Said bulb is secured to an ordinary socket 9 connected to one end of a suitable current transmitting cord 10 extending through the open top of the container and provided at its other end with the usual plug 12 and intermediate its ends with a suitable controlling switch 13.

A heating and illuminating chamber 15 is therefore formed within the container, the upper end of which chamber is closed by a suitable closure 16 of felt or the like, so that it is moisture-proof, said closure having a small central opening 17 through which the cord 10 extends.

The particular position of the closure 16 within the container 1 determines the depth of the heating and illuminating chamber 15. Preferably, said closure is positioned within the container at substantially or just below the level of the water in the tank, so that the heating and illuminating chamber of the container is entirely within said body of water. As a result, there is no loss of heat and illumination is confined to the portion of the tank below the water level. There is, therefore, no glare of light above the water level which makes it difficult to properly see below the water level. Moreover, by confining the light below the level of the water in the tank, a much more effective and pleasing display is obtained, which is quite important in the sale of fish aquariums in general and the present heating and illuminating device in particular.

Arranged within and almost as high as the heating and illuminating chamber 15 is a reflector member 20 having a transverse curvature corresponding to the curvature of the tubular container 1. This reflector has a highly polished inner surface so that it readily reflects the light rays. In its normal daytime position, as indicated in Figs. 1 and 2 it serves to reflect the light rays inwardly toward the center of the tank, and thus make visible the fish in the tank, and when it is in its normal night-time position, indicated in Fig. 3, it serves as a shield to cut off the light rays and protect the fish from any glare of the light. Either this reflector 20 may be adjusted or the container itself may be turned, the latter being possibly more convenient. In practice, the reflector 20 may be a simple sheet of aluminium.

In order that there will be no doubt as to what the temperature of the water of the tank actually is, a simple thermometer 25 is provided, said thermometer being carried by the container 1 by means of a simple bracket 26. Said bracket is shown as having two like parts formed to provide embracing arms 27 for the upper end of the thermometer and embracing arms 28 for the upper end of the container 1. The upper indicating end of the thermometer is, of course, positioned above the water level, as indicated.

What I claim is:

1. A heating and illuminating device for fish aquariums, comprising a transparent tubular container adapted to be placed in an aquarium, a heating and illuminating means in said container, and reflecting means in said container for the light rays of said heating and illuminating means, said reflecting means being a one-piece member and being arranged at one side only of said heating and illuminating means so that it can be used to direct the light rays toward or away from the central part of the aquarium, thereby enabling the reflector to be used at night as a shield to protect the fish from any glare of the light.

2. A heating and illuminating device for fish aquariums, comprising a transparent tubular container adapted to be arranged within a water-containing aquarium tank, said container having a closed bottom and an open top and being of a height greater than the depth of water in said tank, the space within said container providing a chamber, an electric light bulb in said chamber for heating and illuminating purposes, a current conducting cord electrically connected to said bulb, and a closure for the upper end of the heating and illuminating chamber of said container, said closure being adapted to be positioned within said container at any desired height therein, thereby enabling said closure to be positioned at substantially the level of the water in said tank, thus confining the heating and illuminating chamber of said container below said water level, said closure being provided with an opening through which said cord extends and being of yieldable material which enables said closure to be yieldingly compressed and thus positioned in said container at the desired height therein.

In testimony whereof I hereby affix my signature.

JOHN J. ULMAN.